United States Patent [19]

Corompt

[11] 4,089,435
[45] May 16, 1978

[54] TRANSPORTATION EQUIPMENT

[75] Inventor: Antoine Corompt, Saint Etienne, France

[73] Assignee: Bennes Marrel, France

[21] Appl. No.: 750,564

[22] Filed: Dec. 14, 1976

[30] Foreign Application Priority Data

Dec. 16, 1975 France .............................. 75 39212

[51] Int. Cl.² ........................................... B65F 3/00
[52] U.S. Cl. ..................................... 214/304; 49/279;
49/395; 214/82; 214/310; 296/35 A
[58] Field of Search .......................... 214/82, 304, 310;
100/229 A

[56] References Cited

U.S. PATENT DOCUMENTS

| | | | |
|---|---|---|---|
| 3,071,264 | 1/1963 | Totaro et al. | 214/82 |
| 3,720,328 | 3/1973 | Mackenzie | 214/82 X |

Primary Examiner—Robert G. Sheridan
Attorney, Agent, or Firm—Remy J. VanOphem

[57] ABSTRACT

A trailer and a demountable container for transporting loose products or refuse is disclosed herein. The container has an internal ejector slidable over its entire length for ejecting the contents therein. The trailer has mounted on its bed a centering relief longitudinally positioning the container, a pin engaging an aperture in the front of the container holds the container in a lateral position, and a hydraulic ram for moving the internal ejector from the front of the container to the rear. A guide, part on the trailer bed and part in the container, supports the hydraulic ram at intermediate points along its length to prevent the ram from bending or buckling as it is being extended. Coupling and alignment of the mechanical parts and hydraulic ram is insured automatically with the placement of the container on the bed of the trailer.

19 Claims, 23 Drawing Figures

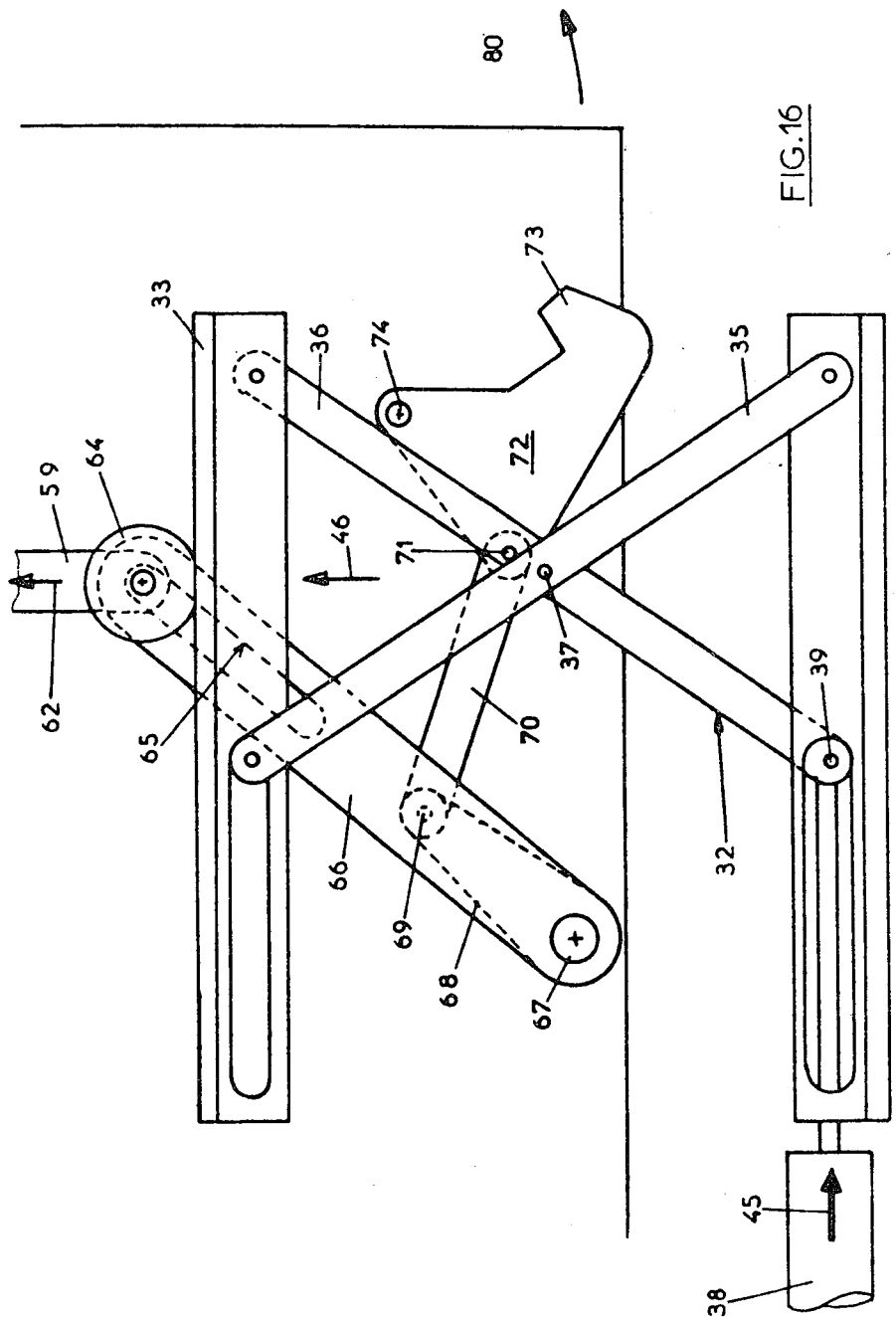

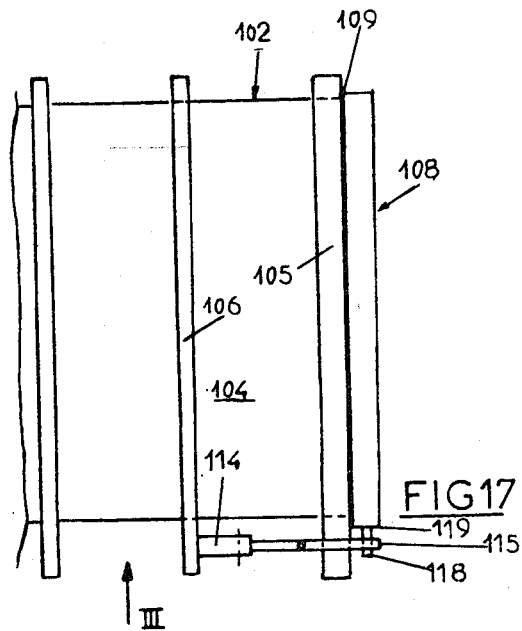
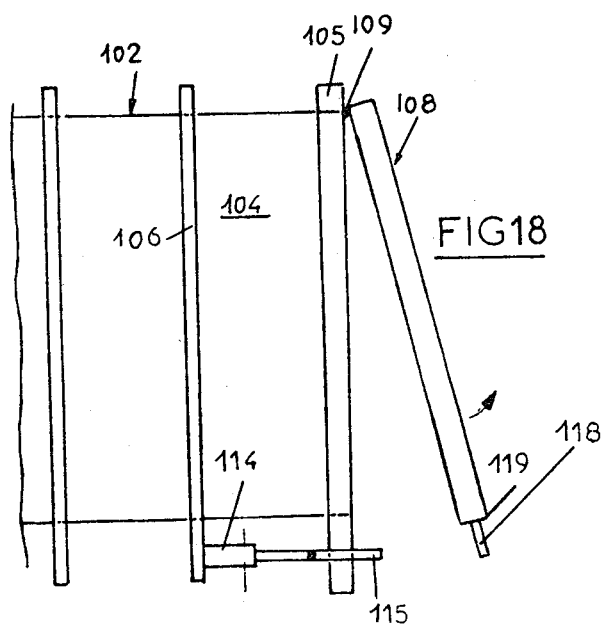

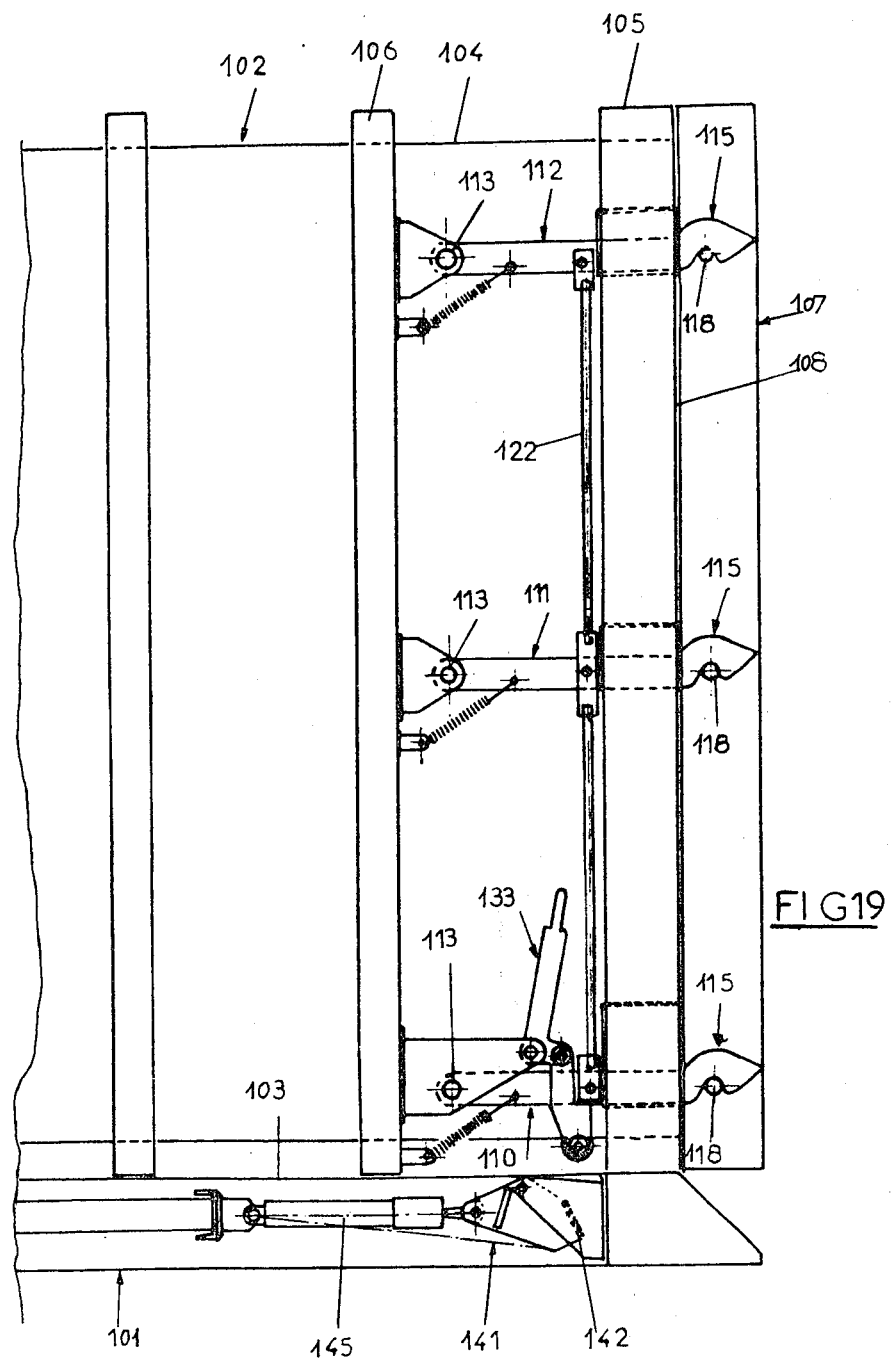

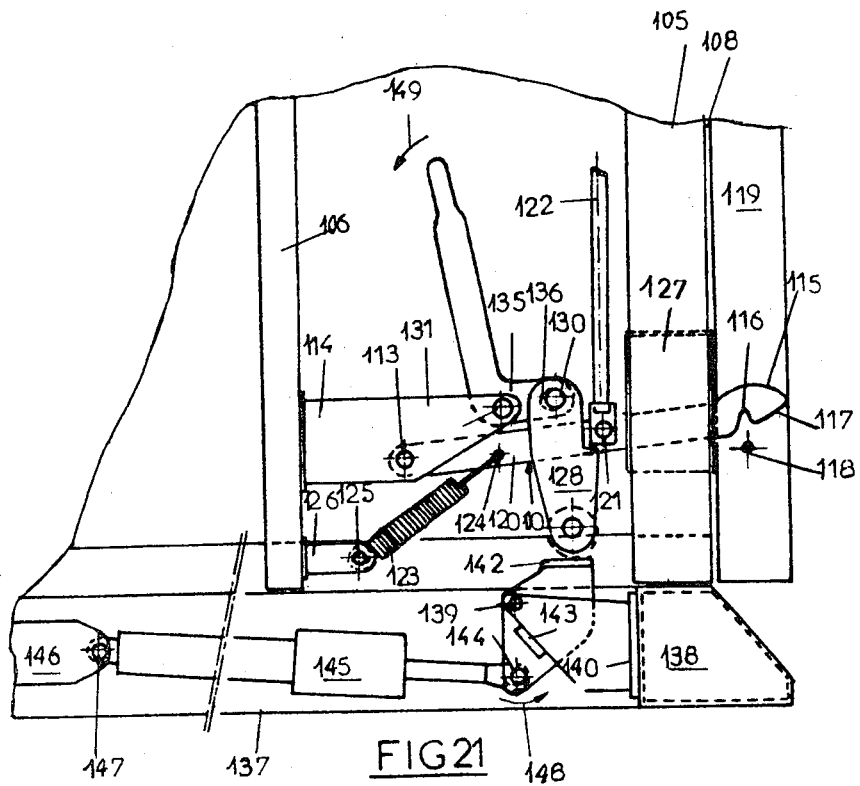

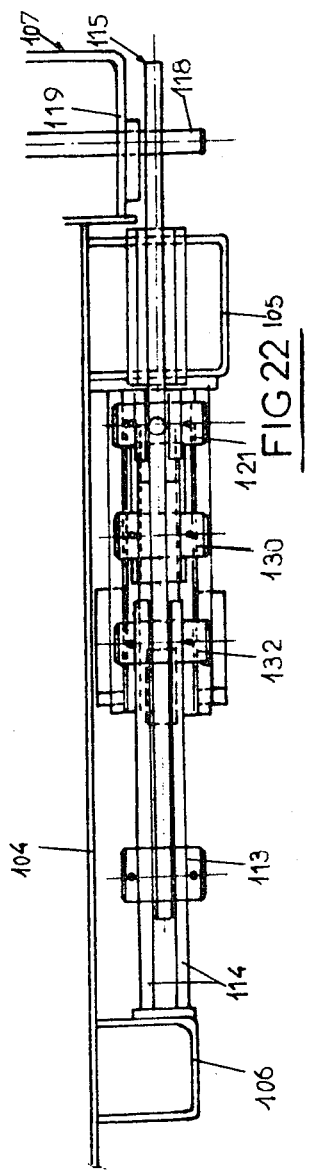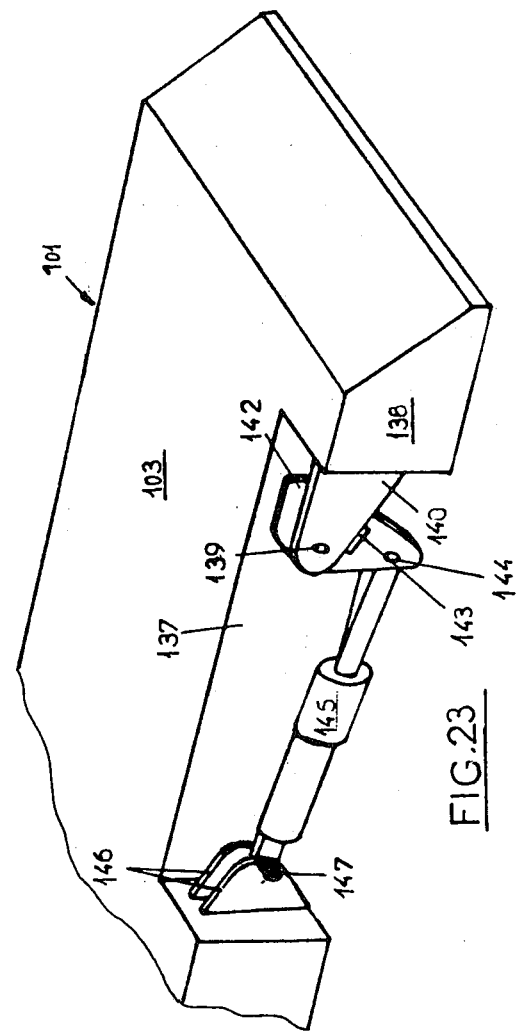

TRANSPORTATION EQUIPMENT

The present invention relates to a transportation container of a new type and it also relates to a vehicle intended to facilitate the use of this container.

The invention relates more particularly to a container provided with an ejector. A container of this type is used for transporting loose products and in particular household refuse.

A container with an ejector of the known type comprises an internal pusher or ejector able to slide in the container over the entire length of the latter. A long hydraulic telescopic ram is arranged horizontally between the front wall of the container and the plate of the pusher. When the ram is retracted, the pusher is located at the front of the container. The latter may thus be loaded, for example filled with compacted household refuse. The door of the container is then closed and the latter is placed on a vehicle which conveys it to a rubbish dump, or to a factory for the treatment of refuse. More often than not, the vehicle used is a semi-trailer lorry.

Once the vehicle has reached the unloading site, the rear door of the container is opened and the long telescopic ram of the pusher is actuated. The effect of this is to push the plate of the pusher rearwards and to eject the refuse through the rear opening of the container.

The empty container is then returned to the factory for loading and compacting the refuse, where it is deposited on a storage and waiting surface, then the vehicle receives another full container and begins a new circuit.

This equipment of known type has a serious drawback. In fact, each container must have its own control membes and hydraulic distribution members in order to be able to actuate:

the ejection pusher on the one hand and the system for opening and closing the door on the other hand.

In particular, each container must have its own telescopic ram, i.e. a ram whose extended length is currently of the order of approximately 10 metres, which means that it must be equipped with special guide means for preventing buckling. This ram and its accessories constitute an extremely expensive arrangement which considerably increases the overall price of the container.

The object of the present invention is to eliminate these drawbacks by providing a container with an ejector which does not comprise its own hydraulic parts, which has the result of reducing its price and of simplifying the operations for maintaining the equipment.

The transportation appliances according to the invention comprise a container provided with an internal ejection pusher and a rear door which can be locked and raised, on the one hand and a vehicle on whose loading platform the container or another similar interchangeable container may be placed, on the other hand and it is characterised in that all the hydraulic members for controlling the door of the container and its ejector are permanently mounted on the vehicle, to which they are connected, whereas for controlling its door and its ejector, the container comprises mechanical parts whose connection to the hydraulic control of the vehicle takes place automatically solely by placing the container on the loading platform.

By means of the invention, it will be understood that it is henceforth possible to service several simple and inexpensive containers with a single vehicle which in turn comprises a complete hydraulic power unit.

The accompanying drawings will make it easier to understand the invention, the constructional details of which have been given as non-limiting examples.

FIG. 1 is a general view showing diagrammatically equipment according to the invention in its position for transportation by road.

FIG. 2 is a similar view, partly in longitudinal section, showing the rear door of the container in the open position.

FIG. 3 shows diagrammatically the detail of the ejector, when the latter is in the waiting position.

FIG. 4 shows the ejector at the end of its ejection stroke.

FIG. 5 is a perspective view showing the arrangement of the platform of a semi-trailer ready to receive the container.

FIG. 6 is a perspective view which shows the front of the container ready to be placed on the platform of the semi-trailer.

FIG. 7 is a longitudinal sectional view on line VII—VII of the front of the container illustrated in FIGS. 6 and 10 when its ejector is in the locked waiting position.

FIG. 8 is a similar view showing the ejector unlocked solely by the fact of having placed the container on the semi-trailer (case of FIGS. 3 and 4).

FIG. 9 is a cross sectional view on line IX—IX (FIG. 4) of the container and the longitudinal members provided on the semi-trailer for preventing any transverse movement of the container during transportation.

FIG. 10 is a similar section on line X—X (FIG. 4), in this case the semi-trailer not being shown.

FIG. 11 is a perspective view of the rear lower left-hand corner of the container, when its door is in the locked position.

FIG. 12 shows the rear left-hand corner of the loading platform of the semi-trailer in the waiting position, i.e. before the container is placed on the latter.

FIG. 13 shows the rear left-hand upper corner of the container when its door is in the locked position, for example during transportation on the semi-trailer.

FIG. 14 shows the corresponding position of the members for controlling the door provided on the semi-trailer and on the container.

FIGS. 15 and 16 are similar views illustrating the operation of unlocking and opening the rear door of the container.

FIG. 17 is a plan view of an arrangement comprising, as a variation, a container and a carrier vehicle, limited to the rear part.

FIG. 18 is a view similar to that of FIG. 17, but with the door of the container open.

FIG. 19 is a side view on line XIX (FIG. 17) showing the locking system in the locked position.

FIG. 20 shows an enlarged portion of FIG. 19.

FIG. 21 is a view similar to that of FIG. 20, but with the locking system in the unlocked position.

FIG. 22 shows an enlarged portion of FIG. 17.

FIG. 23 is a partial perspective view of the carrier vehicle.

FIG. 1 shows a semi-trailer 1 coupled to a road tractor 2. The platform of the semi-trailer 1 carriers a container 3. The invention relates to the particular structure of the platform of the semi-trailer 1 on the one hand and of the container 3 on the other hand.

This container 3 comprises :

a hollow parallelepipedal body 4;

a rear door 5 which can be raised about an upper pivotal arrangement 6, to which it is connected by lateral arms 7;

engagement couplings 8 known by the name of "corner fittings", provided for receiving the hooks of lifting gear of the type known as a "spreader";

an internal ejection plate 9 (FIGS. 2 to 4) intended to be pushed rearwards in order to discharge the refuse or loose material placed in the container, through the open door 5.

By means of the "corner fittings" 8, the spreader lifting gear which is not shown is able to lift the container 3 in the known manner and deposit it either on the ground or on the platform of the semi-trailer 1.

Over its entire length, the platform 10 of this semi-trailer comprises a centering relief 11 with oblique sides 12. This relief 11 is constituted by two longitudinal members 13 of the platform 10 (FIG. 9).

At the front, the platform 10 is surmounted by a box 14 whereof the central part comprises a horizontal base 15. On three sides (along the front edge and two lateral edges), this rectangular base 15 is surrounded by oblique guide walls 16, which surmount the latter to form a type of funnel which is flared upwards. At their lower part, the oblique walls 16 are connected to the base 15 by vertical centering walls 17. A fixed pin 18 whose top is frustoconical rises from the centre of the flat base 15.

Located inside the box 14 are the hydraulic means provided for controlling the ejector plate 9 of the container 3. In particular, these hydraulic means comprise a large horizontal ram 19. The latter is preferably a telescopic ram comprising five stages 20, 21, 22, 23 and 24. The stage 20 of small section is fixed to a point 85 of the box 14 (FIG. 4). The stage 24 of large section is intended to move rearwards thus entraining the plate 9. For this it comprises :

Two engagement flanges 25 which project from the latter on either side;

a cam 26 projecting upwards;

a guide bracket 27 whose ends bent inwards form slide blocks 28 (FIG. 9).

The intermediate stage 22 also comprises a guide bracket 29 whose ends bent inwards form slide blocks 30 (FIG. 10).

When the ram 19 is in the retracted position (FIGS. 3 and 5), the blocks 28 and 30 are all supported by two rails 31 integral with the platform 10 of the semi-trailer.

At the rear, in each of its two corners, the semi-trailer 1 comprises a hydraulically controlled lifting system 32 (FIGS. 5, 12, 14 and 16). Each of these two systems 32 comprises:

An upper plate 33 of T-shaped section;

a lower plate 34 of T-shaped section;

two connecting rods 35 and 36 pivoted one on the other at their centres by a pin 37, in order to form an extensible mechanism of the type known as "Nuremberg Scissors";

a horizontal hydraulic ram 38 whose body is supported on the chassis of the semi-trailer, whereas its rod pivots on a pin 39 integral with the lower and front end of the connecting rod 36;

an elongated opening 40 cut in the vertical web of the T 34 to receive the pin 39 and guide it horizontally when the ram 38 moves it towards the front or rear;

a pin 41 fixed to the rear of the vertical web of the T 34 for pivoting the rear end of the connecting rod 35;

an elongated opening 42 cut in the vertical web of the T 33 for receiving the pin 43 of the front upper end of the connecting rod 35 in order to guide this pin horizontally when it slides towards the front or towards the rear;

a pin 44 fixed to the rear of the vertical web of the T 33 for pivoting the rear end of the connecting rod 36.

It will be understood that it is sufficient to extend the ram 38 in order to push the pin 39 rearwards (FIG. 16, arrow 45) and raise the upper plate 33, which rises (arrow 46) whilst remaining parallel to itself.

In its lower part, the container 3 according to the invention comprises a tunnel 47 over its entire length (FIGS. 6, 9 and 10), whose oblique sides 48 enable the latter to fit exactly on the centering relief 11 of the semi-trailer.

This tunnel 47 projects towards the inside of the container 3, above the base of which it supports two longitudinal rails 49. The rails 49 are located on either side of the tunnel 47. They are able to be placed exactly in the extension of the rails 31 of the semi-trailer, when the container 3 has been placed on the platform 10 (in the case of FIGS. 3 and 4). The arrangement of the rails 31 and 49 thus forms a single guide along which the guide brackets 27 and 29 may slide from the waiting position of FIGS. 3 or 5 (ram 19 completely retracted) to the ejection position where the ram 19, extended to the maximum, pushes the plate 9 as far as the rear opening of the container.

The ejection pusher 9 is hollow. It opens towards the bottom at the front of the container, which thus comprises a cavity 50 at this point (FIGS. 6 and 7). A cross piece 51 welded to the pusher 9 is located in this cavity. The cross piece 51 is provided with two forks 52 which open downwards and cover the flanges 25 on either side of the large section 24 of the ram 19, when the container 3 is placed on the semi-trailer 1 (FIGS. 3, 4, 6 and 7).

The front part of the pusher also comprises a transverse pin 53 (FIGS. 7 and 8) on which a locking hook 54 is pivoted. The nose 55 of this hook is directed towards the front and upwards. It automatically engages under the edge of the front wall 56 of the container 3, when it is subjected to the sole action of a return spring 57, stretched between the hook 54 and a point 57 on the front wall of the pusher 9. Opposite the nose 55, the hook 54 comprises a lever 58 on whose back the cam 26 is able to bear when the container rests on the semi-trailer 1. Thus :

when the container 3 is placed on the ground, the pusher 9 is locked in the front position (FIG. 7);

when it is supported by the semi-trailer 1 with the cam 26 engaged under the lever 58 (FIG. 8), the pusher 9 is automatically unlocked, ready to move back as soon as it is pushed by means of the telescopic ram 19.

At the rear, on each side of its door which can be raised, the container comprises a locking mechanism illustrated in FIGS. 11 and 13 to 16.

This mechanism comprises a vertical upright 59 able to slide vertically along the outer wall of the container. In its upper part, each upright 59 has an elongated opening 60 extending downwards, in which a transverse pin 61 integral with the corresponding arm 7 is engaged. The pin 61 is located at the rear of the pivot 6 for the door 5: it is thus sufficient to raise the uprights 59 (FIG. 15, arrow 62), in order to raise the door 5 about its opening pivot 6.

In its lower part, each upright 59 comprises a transverse pin 63 on which a roller 64 rotates freely. The pin 63 passes through an elongated opening 65, cut in an arm 66, whose front end is pivoted at 67 on the side of the container 3, to the lower part of the latter. The pivot 67 is constituted by a tubular crank pin which is also integral with a crank arm 68. The latter is therefore rigidly connected to the arm 66 with which it may swing. The end of the crank arm 68 is pivoted by a pin 69 to one end of a connecting rod 70, whereof the other end supports a pivot pin 71. The latter is supported by the back of a hook 72, between the nose 73 and the pivot pin 74 of this hook. The nose 73 of the hook is directed upwards and towards the rear of the container. The pin 74 is fixed laterally to the wall of the container. The pin 71 is located below the pin 74.

In its lower part, the door 5 comprises two lateral flanges 75 located on either side of the container. Each flange 75 is provided with a transverse finger member 76 behind which the nose 73 of the corresponding hook 72 is able to rise, when the door 5 is locked in the closed position (FIGS. 1, 11 and 14).

At the front, the front wall of the container 3 is provided with a rectangular plate 77 which projects horizontally beyond the latter (FIGS. 6 and 7). This plate is provided in its centre with an opening 78 able to cover the pin 18 of the box 14 (FIGS. 3 and 5). Furthermore, two triangular braces 79 make the attachment of the plate 77 to the front of the container more rigid. It will be noted that the contour of the plate 77 is identical to that of the base 15 of the guide funnel 16-17 provided on the box 14 of the semi-trailer (FIG. 5).

The operation is as follows:

When the container 3 stands alone, for example placed on the ground (FIG. 6), it comprises no hydraulic means. Its ejector/pusher 9 is locked in the front position by the hook 54 (FIG. 7). The rear door 5 is locked in the closed position (FIG. 11).

To lift the container 3 from the ground, the spreader or grab of a travelling crane is used. The container is raised above the semi-trailer 1 (FIG. 5), then lowered progressively onto the platform 10 of the latter. The plate 77 is introduced approximately into the mouth of the funnel 16, whose oblique walls ensure primary guidance as the container is lowered further. The opening 78 in the plate 77 is thus centered on the pin 18, whose frustoconical top renders the centering more accurate. Centering of the container in the longitudinal direction is ensured by the oblique sides of its lower tunnel 47 intended to fit on the relief 11 of the platform 10.

At the end of this lowering movement of the container, the forks 52 of the cross piece of the pusher 51 automatically cover the engaging flanges 25 of the ram 19. Similarly, the rollers 64 of the rear uprights 59 are automatically placed on the lifting plates 33 of the semi-trailer.

The arrangement is finally in the transportation position illustrated in FIG. 1.

To empty the contents of the container 3, one begins by extending the rear rams 38. Starting from the position of FIGS. 13 and 14, the latter causes raising of the uprights 59. During this first stage of movement, the door 5 remains stationary about its pivot 6. The elongated opening 60 in each upright 59 is raised about its pivot 61 which remains stationary as long as it does not abut against the lower edge of this opening 60.

On the other hand, from this first stage of movement, raising of the crank arm 68 pulls on the connecting rod 70 and causes tilting of the hook 72, whose nose 73 is lowered, thus releasing the locking finger member 76 of the door 5. The latter is henceforth released.

By continuing the raising movement of the plates 33, i.e. of the uprights 59, opening of the door 5 is caused, whose pins 61 are in abutment with the base of the elongated opening 60: the door 5 is thus raised about its pivot 6, as indicated by the arrows 80 (FIGS. 15 and 16).

It is henceforth possible to extend the telescopic ram 19, whose flanges 25 push the ejector plate 9 backwards, which was previously unlocked by the cam 26, which has disengaged the hook 54. Guidance of the ram 19 and plate 9 is ensured by the rails 31 and 49.

It will be seen that simple positioning of the container on the semi-trailer 1 automatically causes all the necessary locking or unlocking operations, such that the equipment is directly ready for use.

As a variation, with reference to the rear door of the container, FIGS. 17 to 23 show a semi-trailer 101 and a container 102 supported by the platform 103 of the semi-trailer.

The container comprises:

a hollow parallelepipedal body 104;

a series of peripheral reinforcing belts which completely surround the body 104 in several successive transverse planes from front to rear. The last belt 105 and the next to the last belt 106 are shown;

a rear door 107 able to close-off the rear opening 108 of the container, or to open by pivoting about a vertical pin 109 integral with the container (FIGS. 17 and 18).

The addition relates more particularly to the systems serving for locking the door 107 on the opening 108 of the container 102 (FIGS. 19 and 20).

On the container, this locking system comprises only mechanical parts, all the hydraulic members being provided on the vehicle 101.

Three locking arms 110 to 112 which are substantially identical are aligned vertically along the left-hand vertical wall of the body 104, against the outer face of this wall. Each arm is flattened parallel to said wall and is pivoted by its front end on a pivot 113 whose substantially horizontal axis is located in a transverse plane of the container. Each pivot 113 is mounted in a yoke 114 integral with the rear side of a left-hand vertical part of the belt 106.

The rear end of each locking arm is provided with a hook 115, whose lower profile comprises, from front to back, a semicircular notch 116, then a ramp 117 sloping rearwards and upwards. The notch 116 is intended to cover a cylindrical finger member 118 integral with the vertical edge 119 of the door 107, opposite the pin 109.

Finally, each locking arm comprises a central rectilinear portion 120 which always remains substantially horizontal and passing through which is a pivot 121, by means of which the arm is pivoted on a vertical rod 122, such that the three arms always remain parallel. Each arm is constantly biased downwards by a helical spring 123 which extends obliquely between a hole 124 in the central portion 120 and a hole 125 provided in a flange 126 welded to the belt 106, below the yoke 114.

The three hooks 115 project to the rear of the orifice 108, passing through recesses 127 cut in the left-hand vertical member of the belt 105, whereas no part of the mechanism projects laterally from the container, whose overall width is that of the belts (FIG. 21).

The central portion 120 of the lower arm 110 is also integral with a support 128 which extends downwards in order to support a roller 129 whose axis is parallel to the axis of the pivot 113 and upwards to support a spindle 130 whose axis is parallel to this same axis. The yoke 114 on which the arm 110 is pivoted, comprises a rear extension 131. A pivot 132, integral with this extension, is engaged through a lever 133 whose large side diverges upwards from the pivot 132 in order to terminate in a handle 134. The small side 135 of the lever 133 diverges rearwards from the pivot 132 in order to terminate in a hole 136 engaged around the pivot or spindle 130. The hole 136 has a diameter clearly greater than that of the spindle 130, in order to facilitate normal clearance of the entire mechanism without jamming.

On the semi-trailer, the locking system is fitted in a recess 137 provided at the rear, in the left-hand edge of the plate 103 and limited towards the rear by a transverse extension 138 of the plate 103. A transverse pivot 139 is connected by its inner end to the plate 103 and by its outer end to a support 140 which extends at the front of the extension 138 (FIG. 22).

The pivot 139 passes through a shoe 141 comprising:

an edge 142 used for co-operating with the roller 129;

a lateral abutment 143 able to co-operate with the support 140;

a pivot 144 by means of which the shoe 141 is pivoted on the front end of a ram 145, whose rear end is pivoted on a yoke 146 by a pivot 147. The yoke 146 is integral with the front wall of the recess 137 and the axis of the ram 145 evolves around a horizontal position in a vertical plane parallel to the major axis of the semi-trailer 101.

The operation is as follows.

When the rear door 107 normally closes the opening 108, the three finger members 113 are trapped in the notches 116, since the arms 110 to 112 are simultaneously biased downwards (FIG. 19):

by gravity, owing to their own weight, by the springs 123.

Locking off the door 107 is thus ensured in a permanent manner whether or not the container 102 is located on the semi-trailer 101.

To control unlocking of the door 107, fluid under pressure is supplied to the inside of the ram 145 in order that it extends, thus pivoting the shoe 141 in the direction shown by arrow 148 (FIG. 20). The useful edge 142 thus rises above the upper level of the plate 103, raising the support 128 by means of the roller 129. The three arms 110 to 112 are raised simultaneously and the finger members 118 are released from the notches 116 to facilitate opening of the door 107.

The movement 148 of the shoe 141 is limited by the abutment 143 bearing on the support 140.

As soon as the arms are raised, the lever 133 pivots in the direction of arrow 149.

Conversely, the three arms may be raised simultaneously by acting manually on the lever 133 in the direction 149, whether or not the container 102 is placed on the semi-trailer 101.

It will be seen that the simple fact of placing the container 102 on the semi-trailer 101, by lowering the container onto the semi-trailer by simple vertical translation, automatically causes connection of the mechanical parts provided on the container for locking the door and the hydraulic control means permanently mounted on the vehicle or semi-trailer 101.

Although, in the example described, the arms 110 to 112 are located on the left-hand side, it is clear that they could also be located on the right-hand side, in a general arrangement which is absolutely symmetrical with respect to the central vertical plane of the semi-trailer and with respect to the central plane of the container, if the axis 109 for pivoting the door 107 is located on the left-hand side.

Since, in the normal position, the hydraulic control system integral with the semi-trailer remains completely fitted in the support platform, the semi-trailer may even comprise a hydraulic control system on each side, in order to receive either containers provided with a rear door which opens from the right-hand side or left-hand side.

I claim:

1. Transportation equipment comprising a vehicle and a removable container mountable thereon, and at least one door enclosing the rear of said structure, said structure including means for locking said at least one door and means for opening said door;

an internal ejection plate movable the length of said structure; and means for mechanically positioning said structure on said vehicle as said structure is placed thereon, said means for mechanically positioning including a rectangular member horizontally disposed at the front of said container, said rectangular member having an aperture centrally disposed therein and wherein said vehicle includes:

a horizontal loading platform having a longitudinal length and a lateral width for receiving said container;

a box-like structure centrally disposed at the front of said loading platform, said box-like structure having a base and surmounted on the front and both sides by oblique walls to form a guide funnel, said guide funnel cooperating with said means for positioning said container to automatically position said container as said container is placed on said loading platform;

a vertical pin fixedly disposed from said base and projecting upwardly, said vertical pin receivable into the aperture of said rectangular member to fixedly hold said container on said loading platform in longitudinal direction; and hydraulic means fixedly attached to the front end of said loading platform for moving said internal ejector plate in a longitudinal direction, said hydraulic means further operative to actuate said means for locking and said means for opening said at least one door.

2. Transportation equipment according to claim 1, wherein said hydraulic means is a horizontal ram disposed inside said box, said ram having one end fixed to said box, and the opposite end directed towards the rear of the vehicle, said opposite end having:

two engagement flanges which horizontally project either side of said ram;

a cam projecting upwards;

at least one guide bracket, wherein said container further includes:

engagement fingers disposed on said internal ejector pusher for engaging said engagement fingers when said container is placed on said loading platform;

ejection pusher lock means for locking said ejection pusher in a fixed position at the front of said container, said ejection pusher lock means actuated by said cam to unlock said ejection pusher when the container is placed on said loading platform; and container guide rails centrally disposed along the base inside of said container, wherein said at least one guide bracket is guided along said guide rails as said ram moves towards the rear of said vehicle.

3. Transportation equipment according to claim 2, wherein said ejector plate is hollow and opens at the bottom at the front of the container.

4. Transportation equipment according to claim 1 wherein said loading platform further includes a longitudinal center guide protruding from its upper surface and wherein said container further includes a tunnel having oblique sides, said tunnel cooperating with said longitudinal center guide to laterally position said container on said loading platform.

5. Transportation equipment according to claim 4, wherein said tunnel projects above the base of said container, and supports said container guide rails; said tunnel exactly positioning said container guide rails in alignment with said vehicle guide rails fixed to the front of the loading platform when the container has been placed on the loading platform, the alignment of these two guide rails thus form a single slide on which may move the ejector plate and the guide brackets of the telescopic ram.

6. Transportation equipment according to claim 2, wherein said vehicle further includes: vehicle guide rails disposed at the front of the loading platform, said vehicle guide rails receiving said at least one guide bracket and supporting said ram when the latter is completely retracted.

7. Transportation equipment according to claim 6 wherein said horizontal ram is a large telescopic ram with at least four expansion stages, and said at least one guide bracket is at least two guide brackets, both of said at least two guide brackets move along said container and vehicle guide rails when the ram extends.

8. Transportation equipment according to claim 7 wherein said vehicle further includes a hydraulically controlled lifting means disposed at the rear corners of said loading platform comprising:
an upper "T" plate movable in an upwards direction;
a fixed lower "T" plate;
two connecting rods pivoted at their centers forming an extensible Nuremberg Scissors mechanism;
a first pin integral with the lower and front end of one of said two connecting rods;
a second pin integral with the upper front end of the other side of two connecting rods;
a horizontal hydraulic ram pivotally supported at one end from said vehicle, and the other end pivotally connected to said pin;
an elongated opening in the vertical web of the lower T plate receiving said first pin and guiding said first pin horizontally when moved by said ram;
a third pin fixed to the rear of the vertical web of the lower plate of T section pivotally supporting the rear end of the other connecting rod;
an elongated opening in the vertical web of the upper T plate receiving said second pin and guiding said second pin horizontally when it slides;
a fourth pin fixed to the rear of the vertical web of the upper T plate pivotally supporting the rear end of the first connecting rod.

9. Transportation equipment according to claim 8 wherein said container further includes a mechanism disposed at the rear and on each side of said at least one door comprising:
a pair of arms fixedly attached to the top edge of said at least one door and pivotally mounted one on either side of said container, one of said arms having a first traverse pin disposed between the door and the pivotal mounting;
a vertical upright having a vertical elongated opening at its upper end engaging said first transverse pin and a second transverse pin disposed at its lower end;
an actuator arm pivotally mounted from the side of said container, said actuator arm having an elongated opening receiving said second transverse pin;
a roller rotatably disposed on said second transverse pin and operative to be raised by the upper T plate of said hydraulically controlled lifting means;
a crank arm integral with said actuator arm;
a lateral flange integral with the door at its lower edge, said flange having a transverse finger member
a hook pivotally mounted to the side of said container, said hook having a nose engaging said traverse finger member in a first position locking said door; and
a connecting rod pivotally mounted to said crank arm and to said hook at a location vertically displaced from the pivotal mounting of said hook when said hook is in said first position.

10. Transportation equipment according to claim 8 further including a system for locking the rear door of the container comprising:
at least one finger member integral with the edge of said door;
at least one locking arm having a front end pivotally mounted to the side of the container, the rear end of said locking arm having a hook able to engage said finger member; and wherein said vehicle further includes:
at least one hydraulically controlled lifting system laterally mounted at the rear in the loading platform of the vehicle, said lifting system operative to co-operate with said system for locking to lift said at least one locking arm disengaging said hook from said finger member.

11. Transportation equipment according to claim 10, wherein said at least one locking arm is a plurality of locking arms and said at least one finger member is a like plurality of finger members and wherein each locking arm is generally rectilinear and flattened parallel to a vertical lateral wall of the container, said plurality of locking arms is located against the outer side of the wall of said container in order to remain substantially horizontal while pivoting in a vertical plane parallel to said wall.

12. Transportation equipment according to claim 11, wherein said container has a plurality of reinforcing belts therearound, and the last of said reinforcing belts is disposed at the rear of the containers, said last reinforcing belt having a plurality of recesses for containing said plurality of locking arms and wherein said plurality of locking arms are pivotally mounted on the next to the last reinforcing belt such that the arrangement of the system for locking remains set back with respect to the overall width of the container defined by the reinforcing belts.

13. Transportation equipment according to claim 12, wherein the hook of each locking arm has a lower profile which comprises, from front to back:
- a substantially semi-circular notch which is open at the bottom in order to cover a cylindrical finger member integral with the vertical edge of the door opposite the pivot pin for this door;
- a ramp sloping upwards and rearwards, and wherein said system for locking further includes a helical spring stretched between the locking arm and a fixed point of the container located below the pivot point of the locking arm, said spring constantly urging said locking arm to a lower position under the joint effect of gravity and of the spring, said finger member co-operates with the ramp of said hook in order to control lifting of the locking arm when the door is closed, said spring urging said locking arm to fall and remain trapped in the notch.

14. Transportation equipment according to claim 13, wherein the container has at least two locking arms connected to each other by a vertical rod pivotally mounted to each arm such that said at least two locking arms always remain parallel to each other.

15. Transportation equipment according to claim 14, wherein the lower locking arm is located close to the lower surface of the container, the central part of said lower locking arm being integral with a downwardly extending abutment, said abutment having a roller disposed at its lower end cooperating with the hydraulic lifting system of the vehicle.

16. Transportation equipment according to claim 15, wherein said system for locking includes an L-sectioned lever pivotally mounted on the container, said lever comprising a long arm which diverges upwards from the pivot in order to terminate in a handle and a short arm which diverges rearwards from the pivot the short arm being pivotally connected to said abutment such that it is possible to unlock the door by pushing the handle forwards .

17. Transportation equipment according to claim 14, wherein the lifting system comprising a horizontally disposed ram, the front end of said ram being pivotally mounted to the vehicle and the rear end of the ram being pivotally connected to a shoe, said shoe pivotally mounted to said vehicle in a vertical plane, said shoe further comprising a useful edge which ramains retracted in the loading platform of the vehicle, when the ram is retracted, but which rises above the upper level of the loading platform simultaneously lifting all the unlocking arms.

18. Transportation equipment according to claim 17, wherein said lifting system is disposed in a recess provided in a lateral edge of the loading platform of the vehicle, said recess being limited towards the rear by a transverse extension of said loading platform, said lifting system further includes a yoke mounted on said extension to which said shoe is pivotally mounted, the arrangement of the lifting system being set back with respect to the overall width of the loading platform.

19. Transportation equipment according to claim 18, wherein said vehicle has two lifting systems, one on the right and one on the left, which are symmetrical to each other with respect to the central vertical plane of the vehicle and which thus enable the vehicle to operate either with containers provided with a door opening on the right or on the left.

* * * * *

UNITED STATES PATENT AND TRADEMARK OFFICE
CERTIFICATE OF CORRECTION

PATENT NO. : 4,089,435

DATED : May 16, 1978

INVENTOR(S) : Antoine Corompt

It is certified that error appears in the above-identified patent and that said Letters Patent are hereby corrected as shown below:

Column 1, preceding line 4, please insert the following subtitles----

Background of the Invention

Field of the Invention ----.

Column 1, preceding line 34, insert the subtitle ----

Description of the Prior Art ----.

Column 1, line 36, delete the word "membes" and insert therefor the word ---- members ---.

Column 1, preceding line 49, insert the subtitle----

Summary of the Invention ----.

Column 2, preceding line 5, insert the subtitle ----

Brief Description of the Drawings ----.

Figure 1:
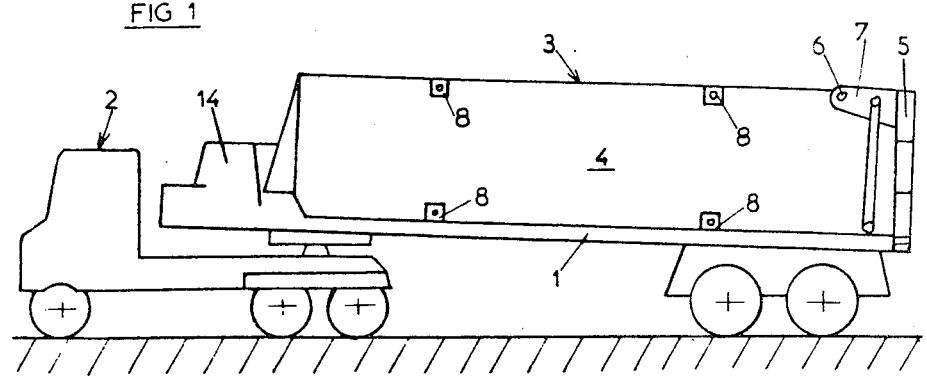
Figure 2:
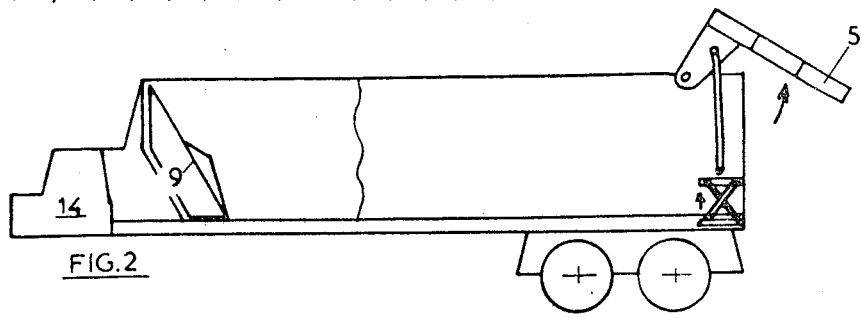
Figure 3:
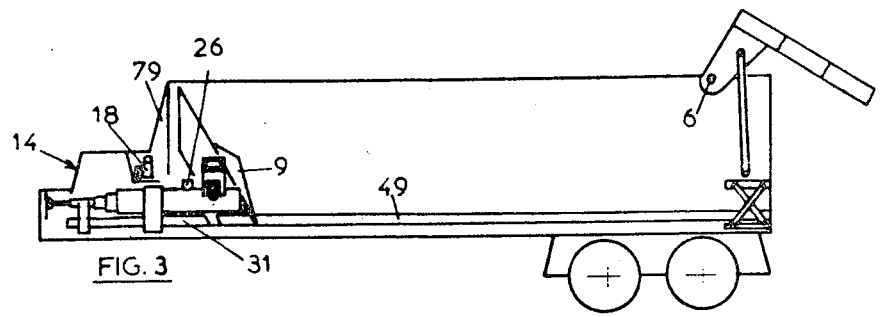
Figure 4:
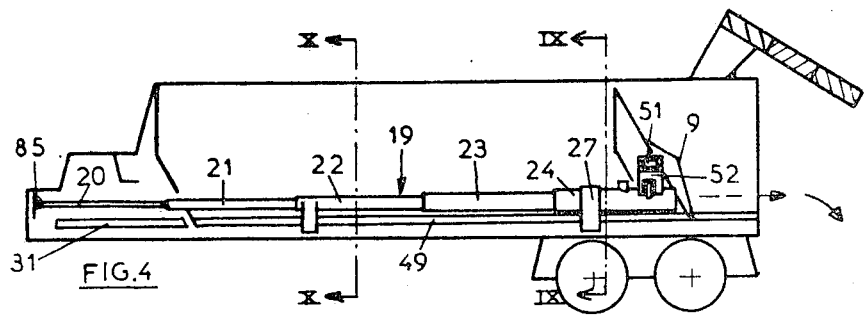
Figure 5:
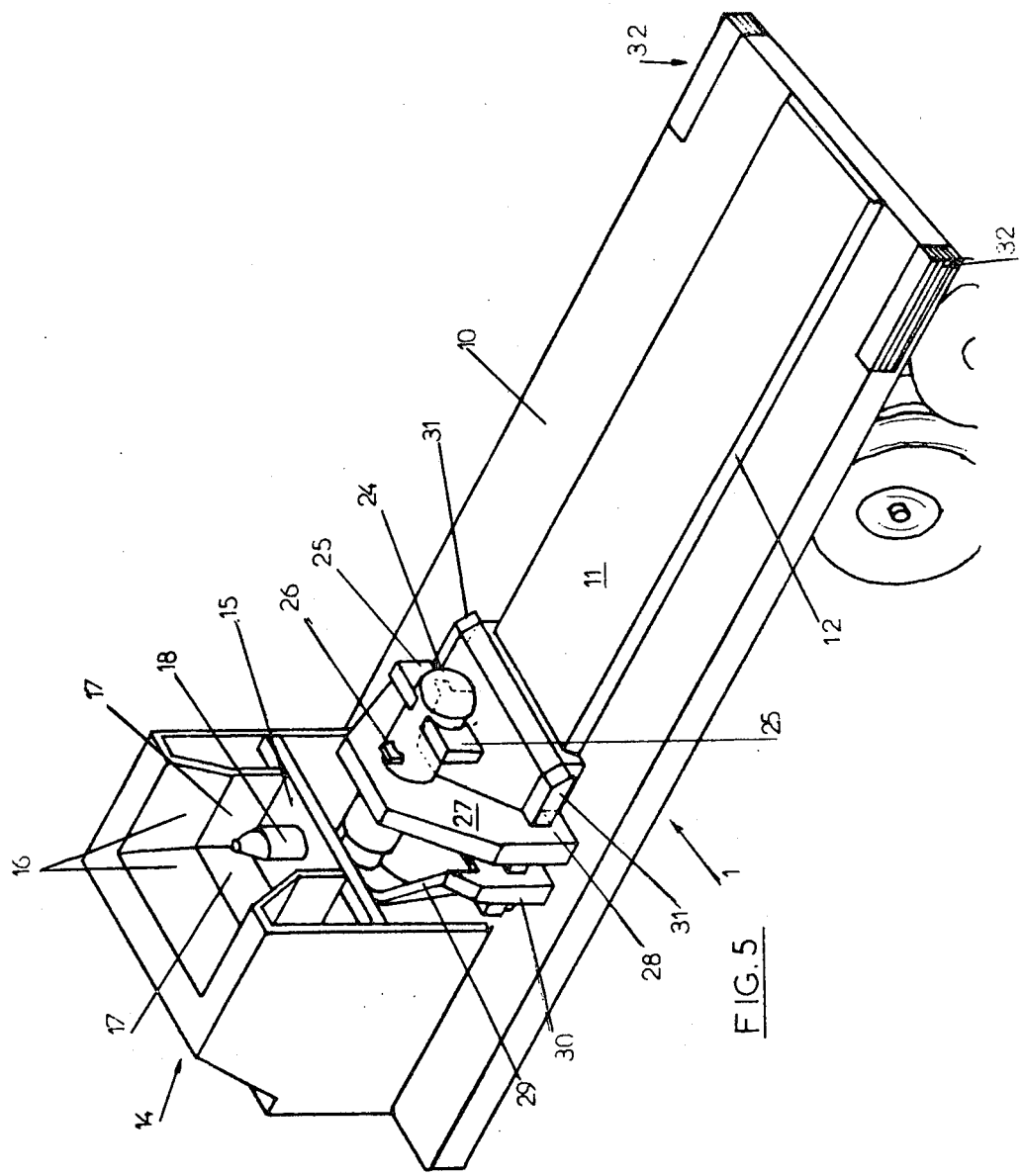
Figure 6:
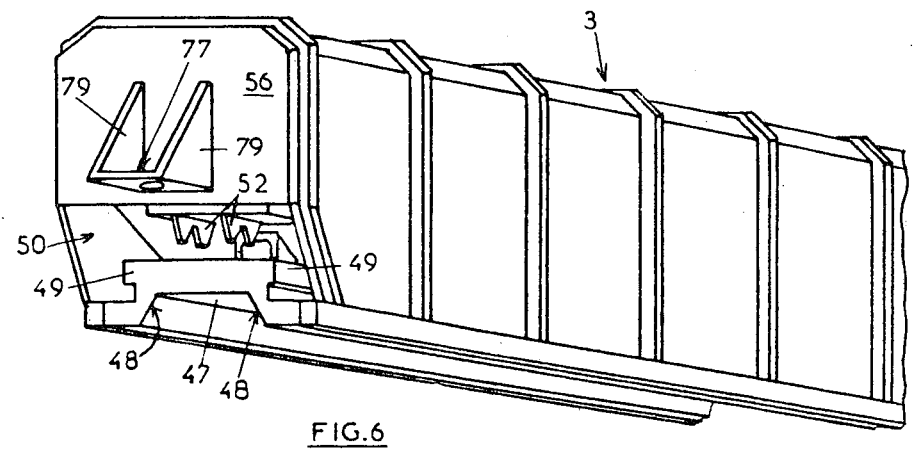
Figure 7:
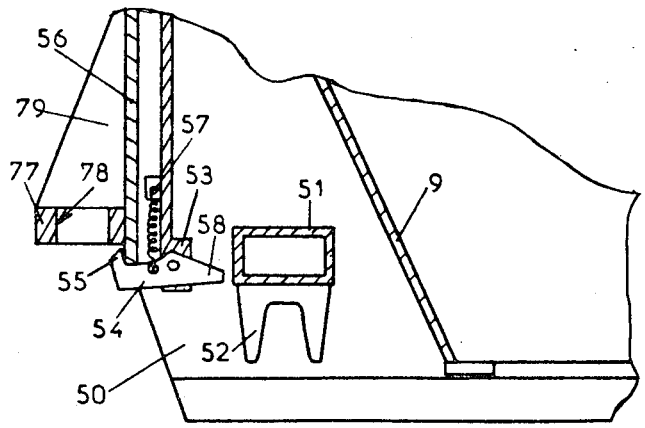
Figure 8:
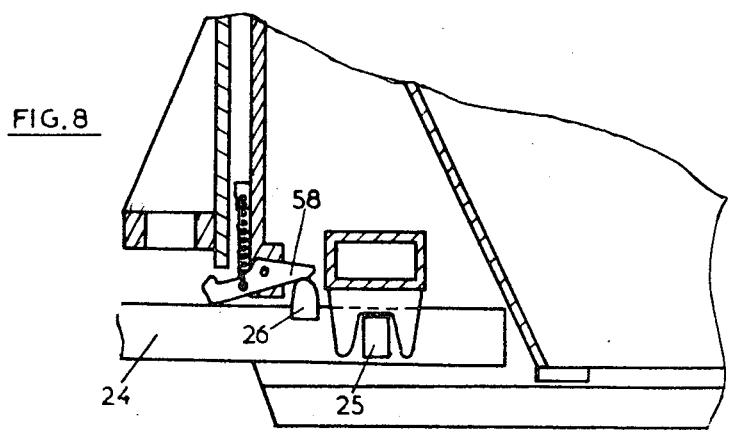
Figure 9:
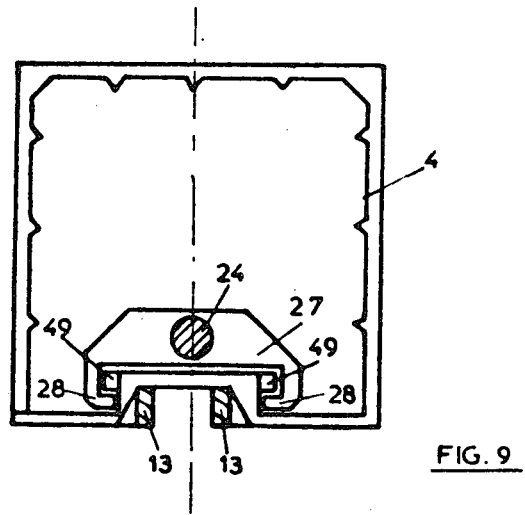
Figure 10:
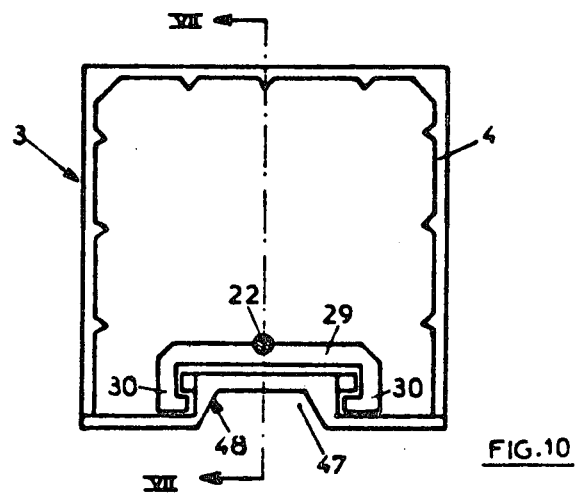
Figure 11:
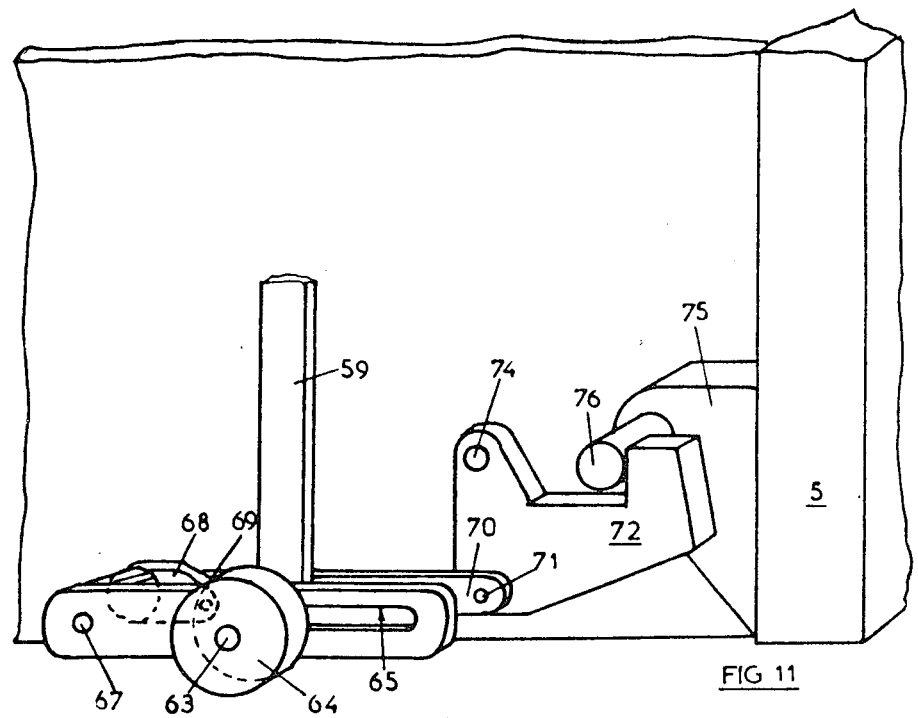
Figure 12:
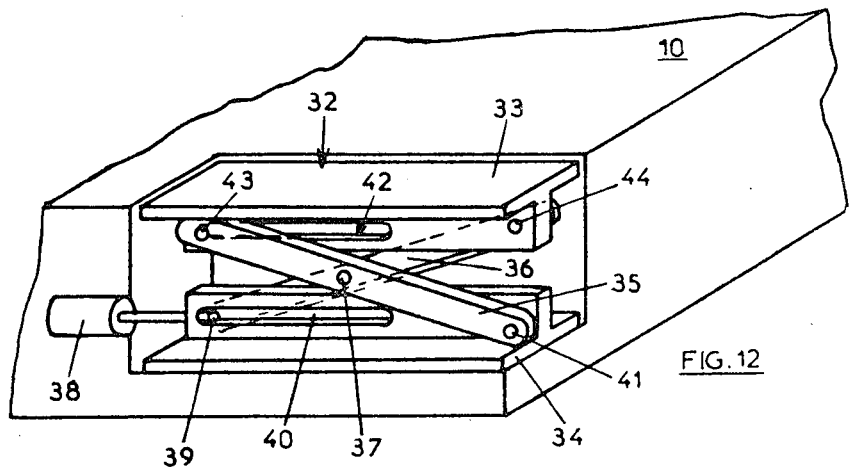
Figure 13:
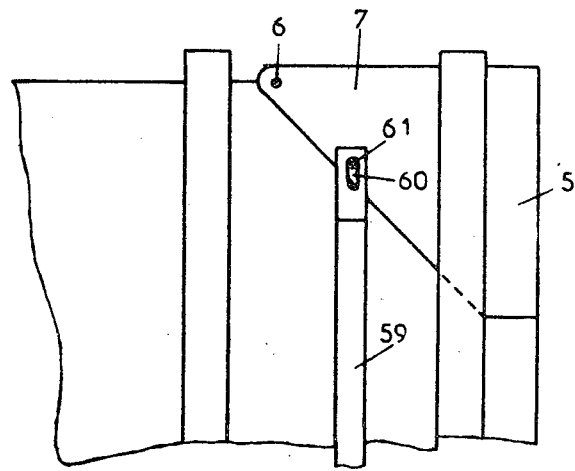
Figure 15:
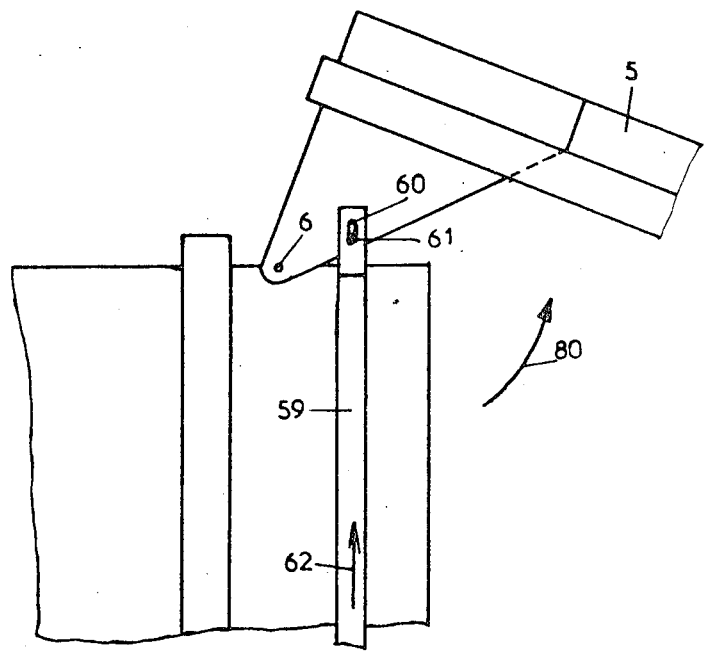
Figure 14:
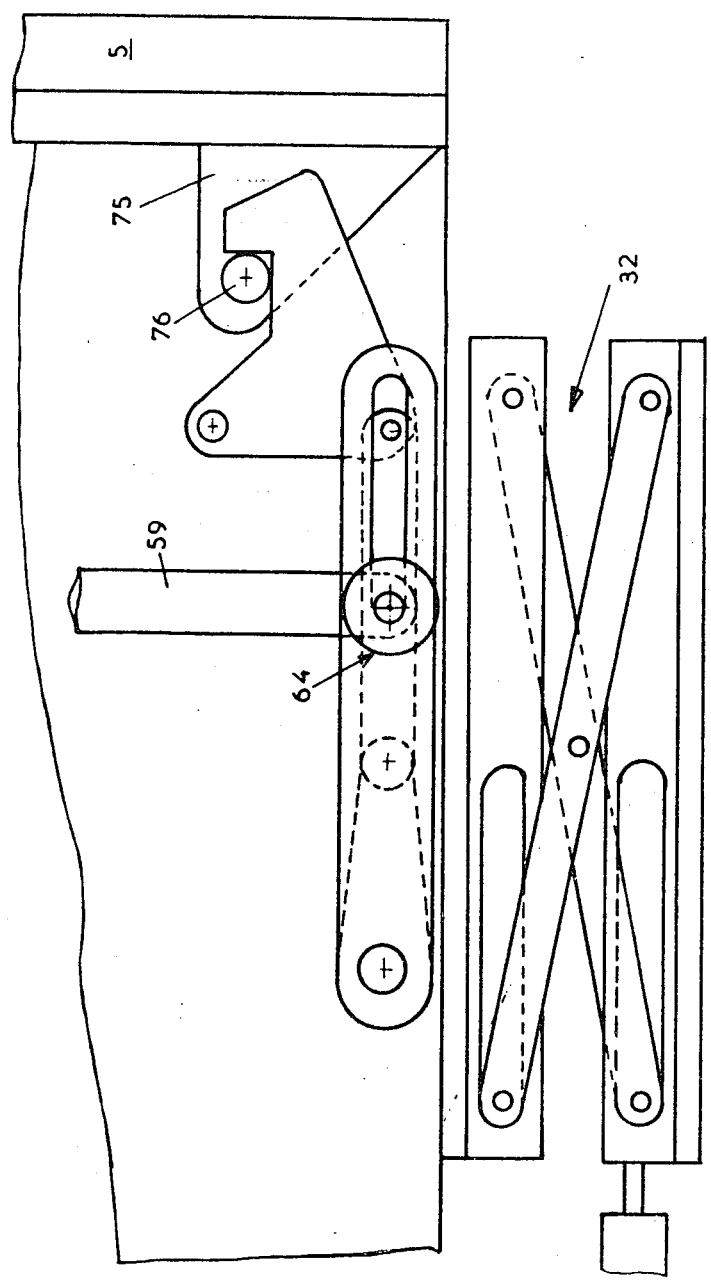
Figure 20:
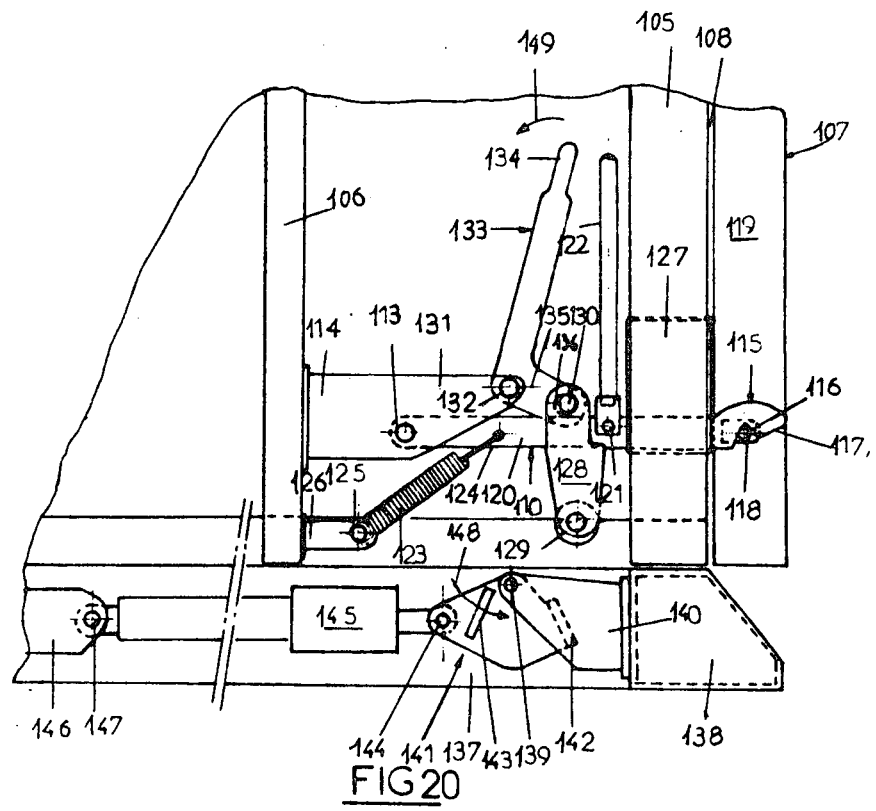

UNITED STATES PATENT AND TRADEMARK OFFICE
CERTIFICATE OF CORRECTION

PATENT NO. : 4,089,435
DATED : May 16, 1978
INVENTOR(S) : Antoine Corompt

It is certified that error appears in the above-identified patent and that said Letters Patent are hereby corrected as shown below:

Column 2, preceding line 64, insert the subtitle ----

Description of the Preferred Embodiment ----.

Column 10, line 6, delete the word "traverse" and insert therefor the word ----transverse----.

Column 10, line 25, delete the word "traverse" and insert the word ----transverse----.

Column 12, line 7, delete the word "comprising" and insert therefor the word ----comprises----.

Signed and Sealed this

Thirty-first Day of October 1978

[SEAL]

Attest:

RUTH C. MASON
Attesting Officer

DONALD W. BANNER
Commissioner of Patents and Trademarks